United States Patent
Arima et al.

(10) Patent No.: US 12,136,525 B2
(45) Date of Patent: Nov. 5, 2024

(54) ELECTROLYTIC CAPACITOR AND METHOD FOR PRODUCING SAME

(71) Applicant: Panasonic Intellectual Property Management Co., Ltd., Osaka (JP)

(72) Inventors: Hiroyuki Arima, Osaka Fu (JP); Takehiro Kobayashi, Osaka Fu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 50 days.

(21) Appl. No.: 17/795,802

(22) PCT Filed: Jan. 29, 2021

(86) PCT No.: PCT/JP2021/003234
§ 371 (c)(1),
(2) Date: Jul. 27, 2022

(87) PCT Pub. No.: WO2021/153730
PCT Pub. Date: Aug. 5, 2021

(65) Prior Publication Data
US 2023/0078283 A1    Mar. 16, 2023

(30) Foreign Application Priority Data
Jan. 31, 2020 (JP) ................. 2020-015779

(51) Int. Cl.
*H01G 9/028* (2006.01)
*H01G 9/00* (2006.01)

(52) U.S. Cl.
CPC ........... *H01G 9/028* (2013.01); *H01G 9/0036* (2013.01)

(58) Field of Classification Search
None
See application file for complete search history.

(56) References Cited

U.S. PATENT DOCUMENTS

| | | | |
|---|---|---|---|
| 6,375,688 B1 * | 4/2002 | Akami | H01G 11/56 29/25.03 |
| 2008/0002334 A1 * | 1/2008 | Kakuma | H01G 9/151 29/25.03 |
| 2009/0021893 A1 * | 1/2009 | Kakuma | H01G 11/48 29/25.03 |
| 2009/0154059 A1 | 6/2009 | Wessling et al. | |

(Continued)

FOREIGN PATENT DOCUMENTS

| | | | |
|---|---|---|---|
| CN | 108028134 A | 5/2018 | |
| EP | 1763099 B1 * | 11/2018 | H01B 1/122 |

(Continued)

OTHER PUBLICATIONS

Translation JP07283086A.*

(Continued)

*Primary Examiner* — Eric W Thomas
(74) *Attorney, Agent, or Firm* — Rimon P.C.

(57) ABSTRACT

Disclosed is an electrolytic capacitor including a capacitor element. The capacitor element includes an anode body having a dielectric layer formed at a surface of the anode body, and an electrolyte layer disposed adjacent to the dielectric layer. The electrolyte layer contains a conductive polymer doped with a dopant, conductive particles, and a non-aqueous solvent.

14 Claims, 2 Drawing Sheets

(56) References Cited

U.S. PATENT DOCUMENTS

| | | | | |
|---|---|---|---|---|
| 2010/0302709 A1* | 12/2010 | Dreissig | ............... | H01G 9/145 |
| | | | | 361/505 |
| 2011/0080690 A1 | 4/2011 | Ning et al. | | |
| 2012/0300368 A1* | 11/2012 | Matsuura | ............... | H01G 11/60 |
| | | | | 361/506 |
| 2014/0092529 A1 | 4/2014 | Nobuta et al. | | |
| 2018/0197685 A1 | 7/2018 | Tsubaki et al. | | |
| 2019/0096589 A1* | 3/2019 | Chen | ............... | H01G 9/028 |

FOREIGN PATENT DOCUMENTS

| | | | | |
|---|---|---|---|---|
| JP | 07283086 A | * | 10/1995 | ............ H01G 11/52 |
| JP | H09-320902 A | | 12/1997 | |
| JP | 2007-529586 A | | 10/2007 | |
| JP | 2011-082313 A | | 4/2011 | |
| JP | 2019-087558 A | | 6/2019 | |
| WO | 2012/117994 A1 | | 9/2012 | |

OTHER PUBLICATIONS

International Search Report issued in International Patent Application No. PCT/JP2021/003234, mailed Apr. 20, 2021; with English translation.

Chinese Office Action dated Aug. 1, 2023 issued in the corresponding Chinese Patent Application No. 202180011179.9, with partial English translation.

* cited by examiner

ELECTROLYTIC CAPACITOR AND METHOD FOR PRODUCING SAME

CROSS-REFERENCE OF RELATED APPLICATIONS

This application is the U.S. National Phase under 35 U.S.C. § 371 of International Patent Application No. PCT/JP2021/003234, filed on Jan. 29, 2021, which in turn claims the benefit of Japanese Patent Application No. 2020-015779, filed on Jan. 31, 2020, the entire disclosures of which Applications are incorporated by reference herein.

TECHNICAL FIELD

The present disclosure relates to an electrolytic capacitor and a method for producing the same.

BACKGROUND ART

Capacitors used in electronic devices are required to have a large capacity and a low equivalent series resistance (ESR) in a high frequency region. A promising example of a capacitor having a large capacity and a low ESR is an electrolytic capacitor using a conductive polymer, such as polypyrrole, polythiophene, polyfuran, and polyaniline Patent Literature 1 (WO2012/117994) discloses, as a conductive polymer solution for forming a solid electrolyte layer, "a conductive polymer solution containing a conductive polymer, polysulfonic acid or a salt thereof that functions as a dopant for the conductive polymer, a mixture of a polyacid and a carbon material, and a solvent" (claim 1 of Patent Literature 1). Patent Literature 1 discloses a solid electrolytic capacitor produced using the conductive polymer solution.

CITATION LIST

Patent Literature

[PTL 1] WO2012/117994

SUMMARY OF INVENTION

Technical Problem

Currently, there is a demand for an electrolytic capacitor in which the increase in ESR is low over a long period. Under such circumstances, one of the objectives of the present disclosure is to provide an electrolytic capacitor in which the increase in ESR is low over a long period.

Solution to Problem

One aspect of the present disclosure relates to an electrolytic capacitor. The electrolytic capacitor includes a capacitor element, wherein the capacitor element includes an anode body having a dielectric layer formed at a surface of the anode body, and an electrolyte layer disposed adjacent to the dielectric layer, and the electrolyte layer contains a conductive polymer doped with a dopant, conductive particles, and a non-aqueous solvent.

Another aspect of the present disclosure relates to a method for producing an electrolytic capacitor. The producing method includes: a step (i) of preparing a capacitor element precursor including an anode body having a dielectric layer formed at a surface of the anode body, a step (ii) of forming a polymer layer containing a conductive polymer doped with a dopant, and conductive particles, so as to be adjacent to the dielectric layer, by an impregnation treatment, and a step (iii) of impregnating the polymer layer with a non-aqueous solvent.

Advantageous Effects of Invention

According to the present disclosure, an electrolytic capacitor in which the increase in ESR is low over a long period can be provided.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

Figure 1:
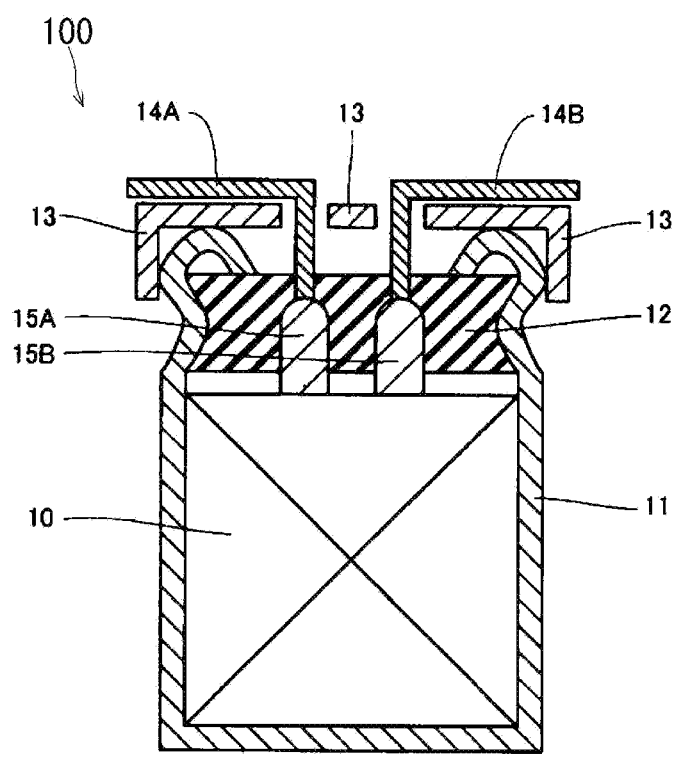
FIG. 1 A schematic cross-sectional view of an example of an electrolytic capacitor of the present disclosure.

In the following, embodiments of the present disclosure will be described by way of examples, but the present disclosure is not limited to the examples described below. In the description below, specific numerical values and materials are exemplified in some cases, but other numerical values and materials may be applied as long as the effects of the present disclosure can be achieved.

(Electrolytic Capacitor)

An electrolytic capacitor of the present disclosure includes a capacitor element. The capacitor element includes an anode body having a dielectric layer formed at a surface of the anode body, and an electrolyte layer disposed adjacent to the dielectric layer. The electrolyte layer contains a conductive polymer doped with a dopant, conductive particles, and a non-aqueous solvent.

The capacitor element may include a foil-form anode body having a dielectric layer formed at a surface of the anode body, a foil-form cathode body, a separator disposed between the anode body and the cathode body, and an electrolyte layer disposed between the anode body and the cathode body. In the following, such a capacitor element is sometimes referred to as a "first capacitor element." The first capacitor element may be a wound type or a stacked type. In an example of a wound-type capacitor element, a foil-form anode body, a foil-form cathode body, and a separator are wound, with the separator disposed between the anode body and the cathode body. In an example of a stacked-type capacitor element, a foil-form anode body, a foil-form cathode body, and a separator are folded in a zigzag pattern, with the separator disposed between the anode body and the cathode body.

Alternatively, the capacitor element may include a porous anode body having a dielectric layer formed at a surface of the anode body, a cathode layer, and an electrolyte layer disposed between the anode body and the cathode layer. In the following, such a capacitor element is sometimes referred to as a "second capacitor element." In the first and second capacitor elements, the electrolyte layer is adjacent to the dielectric layer formed at the surface of the anode body.

(Conductive Polymer)

The conductive polymer contained in the electrolyte layer will be described below.

Examples of the conductive polymer include polypyrrole, polythiophene, polyfuran, polyaniline, polyacetylene, and derivatives thereof. The derivatives include polymers whose backbones are polypyrrole, polythiophene, polyfuran, polyaniline, and polyacetylene. For example, the derivative of polythiophene includes poly(3,4-ethylenedioxythiophene) and the like. These conductive polymers may be used singly or in combination of two or more kinds. The conductive polymer may be a copolymer of two or more kinds of monomers. The weight average molecular weight of the conductive polymer is not limited, and may be in the range of, for example, 1,000 to 100,000. A preferred example of the conductive polymer is poly(3,4-ethylenedioxythiophene) (PEDOT).

The conductive polymer is doped with a dopant. In view of suppressing dedoping from the conductive polymer, the dopant is preferably a polymer dopant. Examples of the polymer dopant include polyvinyl sulfonic acid, polystyrene sulfonic acid, polyallyl sulfonic acid, polyacrylic sulfonic acid, polymethacrylic sulfonic acid, poly(2-acrylamidemethylpropanesulfonic acid), polyisoprene sulfonic acid, and polyacrylic acid. These may be used singly or in combination of two or more kinds. Some of these may be included in the form of a salt in the electrolyte layer. A preferred example of the dopant is polystyrene sulfonic acid (PSS).

The weight average molecular weight of the dopant is not limited. In view of facilitating the formation of a homogeneous electrolyte layer, the weight average molecular weight of the dopant may be set in the range of 1,000 to 100,000.

In the electrolytic capacitor of the present disclosure, the dopant may be polystyrene sulfonic acid, and the conductive polymer may be poly(3,4-ethylenedioxythiophene). That is, the electrolyte layer may contain poly(3,4-ethylenedioxythiophene) doped with polystyrene sulfonic acid.

(Liquid Component)

The electrolyte layer of the electrolytic capacitor of the present disclosure contains a non-aqueous solvent. The electrolyte layer may contain an electrolyte solution (non-aqueous electrolyte solution) containing a non-aqueous solvent and a base component dissolved in the non-aqueous solvent. That is, the electrolyte layer of the electrolytic capacitor of the present disclosure may contain a liquid component. In the following, the liquid component (non-aqueous solvent or electrolyte solution) contained in the electrolyte layer is sometimes referred to as a "liquid component (L)." In the present specification, the liquid component (L) may be a component that is liquid at room temperature (25° C.) or may be a component that is liquid at the temperature at which the electrolytic capacitor is used. An electrolytic capacitor having an electrolyte layer containing a liquid component (L) is sometimes called a hybrid capacitor.

The non-aqueous solvent contained in the electrolyte layer may be an organic solvent or an ionic liquid. Examples of the non-aqueous solvent include: polyhydric alcohols, such as ethylene glycol and propylene glycol; cyclic sulfones, such as sulfolane (SL); lactones, such as γ-butyrolactone (γBL); amides, such as N-methylacetamide, N,N-dimethylformamide, and N-methyl-2-pyrrolidone; esters, such as methyl acetate; carbonate compounds, such as propylene carbonate; ethers, such as 1,4-dioxane; ketones, such as methylethylketone; and formaldehyde.

As the non-aqueous solvent, a polymer-based solvent may be used. Examples of the polymer-based solvent include polyalkylene glycol, a derivative of polyalkylene glycol, and a compound formed by substituting polyalkylene glycol (including its derivative) for at least one of the hydroxy groups in a polyhydric alcohol. Specific examples of the polymer-based solvent include polyethylene glycol (PEG), polyethylene glycol glyceryl ether, polyethylene glycol diglyceryl ether, polyethylene glycol sorbitol ether, polypropylene glycol, polypropylene glycol glyceryl ether, polypropylene glycol diglyceryl ether, polypropylene glycol sorbitol ether, and polybutylene glycol. Examples of the polymer-based solvent further include an ethylene glycol-propylene glycol copolymer, an ethylene glycol-butylene glycol copolymer, and a propylene glycol-butylene glycol copolymer. The non-aqueous solvent may be used singly, or in combination by mixing two or more kinds.

As described above, the electrolyte layer may contain a non-aqueous solvent, and a base component (base) dissolved in the non-aqueous solvent. The electrolyte layer may contain a non-aqueous solvent, and a base component and/or an acid component (acid) dissolved in the non-aqueous solvent.

As the acid component, a polycarboxylic acid and a monocarboxylic acid can be used. Examples of the polycarboxylic acid include aliphatic polycarboxylic acid ([saturated polycarboxylic acid, such as oxalic acid, malonic acid, succinic acid, glutaric acid, adipic acid, pimelic acid, suberic acid, azelaic acid, sebacic acid, 1,6-decandicarboxylic acid, and 5,6-decandicarboxylic acid]; [unsaturated polycarboxylic acid, such as maleic acid, fumaric acid, and itaconic acid]), aromatic polycarboxylic acid (e.g., phthalic acid, isophthalic acid, terephthalic acid, trimellitic acid, pyromellitic acid), and alicyclic polycarboxylic acid (e.g., cyclohexane-1,2-dicarboxylic acid, cyclohexene-1,2-dicarboxylic acid).

Examples of the monocarboxylic acid include aliphatic monocarboxylic acid (with 1 to 30 carbon atoms) ([saturated monocarboxylic acid, such as formic acid, acetic acid, propionic acid, butyric acid, isobutyric acid, valeric acid, caproic acid, enanthic acid, caprylic acid, pelargonic acid, lauric acid, myristic acid, stearic acid, and behenic acid]; [unsaturated monocarboxylic acid, such as acrylic acid, methacrylic acid, and oleic acid]), aromatic monocarboxylic acid (e.g., benzoic acid, cinnamic acid, naphthoic acid), and oxycarboxylic acid (e.g., salicylic acid, mandelic acid, resorcylic acid).

Among these, maleic acid, phthalic acid, benzoic acid, pyromellitic acid, and resorcylic acid are thermally stable, and preferably used.

As the acid component, an inorganic acid may be used. Typical examples of the inorganic acid include phosphoric acid, phosphorous acid, hypophosphorous acid, alkyl phosphate ester, boric acid, fluoroboric acid, tetrafluoroboric acid, hexafluorophosphoric acid, benzenesulfonic acid, and naphthalenesulfonic acid. As the acid component, a composite compound of an organic acid and an inorganic acid may be used. Examples of such a composite compound include borodiglycolic acid, borodioxalic acid, and borodisalicylic acid.

The base component may be a compound having an alkyl-substituted amidine group, and may be, for example, an imidazole compound, a benzoimidazole compound, an alicyclic amidine compound (pyrimidine compound, imidazoline compound) or the like. Specifically, 1,8-diazabicyclo[5,4,0]undecene-7, 1,5-diazabicyclo[4,3,0]nonen-5, 1,2-dimethylimidazolinium, 1,2,4-trimethylimidazoline, 1-methyl-2-ethyl-imidazoline, 1,4-dimethyl-2-ethylimidazoline, 1-methyl-2-heptylimidazoline, 1-methyl-2-(3'heptyl) imidazoline, 1-methyl-2-dodecylimidazoline, 1,2-dimethyl-1,4,5,6-tetrahydropyrimidine, 1-methylimidazole, and 1-methylbenzoimidazole are preferred. By using these, a capacitor having an excellent impedance performance can be obtained.

As the base component, a quaternary salt of a compound having an alkyl-substituted amidine group may be used. Examples of such a base component include an imidazole compound, a benzimidazole compound, and an alicyclic amidine compound (pyrimidine compound, imidazoline compound), which are quaternized with an alkyl group or an arylalkyl group having 1 to 11 carbon atoms. Specifically, 1-methyl-1,8-diazabicyclo[5,4,0]undecene-7, 1-methyl-1,5-diazabicyclo[4,3,0]nonen-5, 1,2,3-trimethylimidazolinium, 1,2,3,4-tetramethylimidazolinium, 1,2-dimethyl-3-ethylimidazolinium, 1,3,4-trimethyl-2-ethylimidazolinium, 1,3-dimethyl-2-heptylimidazolinium, 1,3-dimethyl-2-(3'heptyl)imidazolinium, 1,3-dimethyl-2-dodecylimidazolinium, 1,2,3-trimethyl-1,4,5,6-tetrahydropyrimidium, 1,3-dimethylimidazolium, 1-methyl-3-ethylimidazolium, and 1,3-dimethylbenzoimidazolium are preferred. By using these, a capacitor having an excellent impedance performance can be obtained.

As the base component, a tertiary amine may be used. Examples of the tertiary amine include trialkylamines (e.g., trimethylamine, dimethylethylamine, methyldiethylamine, triethylamine, dimethyl-n-propylamine, dimethylisopropylamine, methylethyl-n-propylamine, methylethylisopropylamine, diethyl-n-propylamine, diethylisopropylamine, tri-n-propylamine, triisopropylamine, tri-n-butylamine, tri-tert-butylamine), and phenyl group-containing amines (e.g., dimethylphenylamine, methylethylphenylamine, diethylphenylamine) Among them, trialkylamines are preferred in terms of enhancing the conductivity of the electrolyte layer, and more preferably, at least one selected from the group consisting of trimethylamine, dimethylethylamine, methyldiethylamine and triethylamine is contained. Also, as the base component, a secondary amine such as dialkylamines, a primary amine such as monoalkylamine, and ammonia may be used.

The liquid component (L) may contain a salt of an acid component and a base component. The salt may be an inorganic salt and/or an organic salt. The organic salt is a salt in which at least one of the anion and the cation contains organic substance. As the organic salt, for example, trimethylamine maleate, triethylamine borodisalicylate, ethyldimethylamine phthalate, mono 1,2,3,4-tetramethylimidazolinium phthalate, mono 1,3-dimethyl-2-ethylimidazolinium phthalate, and the like may be used. Even when the liquid component (L) contains a salt of an acid component and a base component, dedoping is likely to occur due to the base component contained in the salt, and this makes the configuration of the present disclosure particularly effective.

In order to suppress the dedoping of the dopant, the pH of the liquid component (L) may be set to less than 7, or may be set to 5 or less (e.g., in the range of 2 to 4.5).

In electrolytic capacitors, it is critical that the ESR is low. A low ESR can be achieved by using an electrolyte layer containing a conductive polymer doped with a dopant. The present inventors found, however, that when using an electrolyte layer containing a conductive polymer doped with a dopant and a liquid component (L), although the initial ESR is low, the ESR increases over time, and the deterioration becomes remarkable. The present inventors examined the cause and found that the dopant is easily dedoped in some cases when the electrolyte layer contains a liquid component (L). This dedoping is considered to cause the ESR to increase over time. Therefore, in an electrolytic capacitor containing a liquid component (L), it is important to suppress the increase in ESR over time, as compared to in a solid electrolytic capacitor including a solid electrolyte containing no liquid component (L).

The conductive polymer has high conductivity, and therefore is effective in reducing the ESR. However, the conductivity of the conductive polymer decreases due to deterioration over time, and the ESR increases. Especially when the electrolyte layer contains a liquid component (L), the increase in ESR is severe. On the other hand, the conductivity of conductive particles is considered to hardly decrease over time. Therefore, by adding conductive particles, the increase in ESR over time can be suppressed.

In the electrolytic capacitor of the present disclosure, the dopant may be a dopant containing an acidic group or may be a polymer dopant containing an acidic group. As a result of examination, the present inventors newly found that when a dopant containing an acidic group is used, dedoping may occur remarkably as the pH increases. Therefore, when a dopant containing an acidic group is used, it is especially important to suppress the increase in ESR over time.

In the electrolytic capacitor of the present disclosure, the dopant may be a polymer dopant containing an acidic group, and, the electrolyte layer may contain an electrolyte solution containing a non-aqueous solvent and a base component dissolved in the non-aqueous solvent. In this case, dedoping tends to occur due to the base component. It is therefore especially important to suppress the increase in ESR over time. As described above, in the electrolytic capacitor of the present disclosure, since conductive particles are contained, the increase in ESR over time can be suppressed.

Examples of the acidic group include a sulfonic acid group and a carboxyl group. The polymer dopant containing an acidic group is a polymer in which at least part of the constituent units contains an acidic group. Examples of such a polymer dopant include the aforementioned polymer dopants.

In the electrolytic capacitor of the present disclosure, the content of the base component in the electrolyte solution may be 0.1 mass % or more and 20 mass % or less. When the base component is contained in an amount of 0.1 mass % or more, it is especially important to use conductive particles. When the base component is contained in an amount of 20 mass % or less, the base component can be easily dissolved in the electrolyte solution. Here, when the electrolyte solution contains a salt of an acid component and a base component (e.g., when the electrolyte solution contains the salt as a solute), the content of the base component in the electrolyte solution can be determined from the mass of the electrolyte solution and the mass of the base component of the salt.

The content of the liquid component (L) in the electrolyte layer may be in the range of 50 to 99.5 mass %. The total content of the conductive polymer and the dopant in the electrolyte layer may be in the range of 0.5 to 10 mass %. The content of the conductive particles in the electrolyte layer may be in the range of 0.025 to 5 mass %. The total mass Wm (g) of the conductive polymer and the dopant contained in the electrolyte layer and the mass Wp (g) of the conductive particles contained in the electrolyte layer may satisfy $1 < Wm/Wp$, and may satisfy, for example, $2 \leq Wm/Wp \leq 20$. Alternatively, the ratio Wp/Wm may be 0.05 or more, 0.15 or more, 0.35 or more, 0.50 or more, or 1.0 or more. The ratio Wp/Wm may be 10 or less, 5.0 or less, or 2.0 or less. These lower limits and upper limits may be combined in any combination. For example, the ratio Wp/Wm may be in the range of 0.05 to 10, the range of 0.15 to 10, the range of 0.35 to 10, or the range of 0.50 to 10, or 1.0 to 10. Any of the upper limits of these ranges may be replaced with 5.0 or 2.0. By setting the ratio Wp/Wm to 0.05 or more (e.g., 0.15 or more, 0.35 or more, or 1.0 or more), an electrolytic capacitor in which the percentage increase in ESR is particularly low. By setting the ratio Wp/Wm to 10 or less (e.g., 5.0 or less, or 2.0 or less), the ESR can be particularly reduced, and the decrease in capacitance can also be suppressed. The ratio Wp/Wm is equal to (Content of conductive particles in electrolyte layer)/(Total content of conductive polymer and dopant in electrolyte layer).

(Conductive Particles)

The conductive particles contained in the electrolyte layer will be described below. The conductive particles are particles made of an electrically conductive material. It is to be noted that the conductive particles differ from the aforementioned conductive polymer. The conductive particles are typically made of a material which is not a polymer.

The conductive particles contained in the electrolyte layer may include only one kind of conductive particles, or may include two or more kinds of conductive particles. The conductive particles may be particles of a conductive carbon material, or may be particles of a material other than the conductive carbon material. Examples of the material other than the conductive carbon material include a conductive nickel-phosphorus (Ni—P) material, a conductive indium-tin (In—Sn) material, a conductive tin oxide, and a conductive tin-silver (Sn—Ag). The conductive particles may be metal particles (e.g., particles of nickel or other metals).

In the electrolytic capacitor of the present disclosure, the conductive particles may include at least one kind of particles selected from the group consisting of carbon black particles, carbon nanotube particles, graphite particles, and graphene particles. These particles are preferable in that the average particle size, the particle-to-particle structure, and the surface texture can be variously controlled. The conductive particles may be composed of only one kind of particles among these particles, or may be composed of two or more kinds of particles among these particles.

In the electrolytic capacitor of the present disclosure, the total mass of the conductive polymer and the dopant contained in the electrolyte layer may be larger than the mass of the conductive particles contained in the electrolyte layer. That is, the total content (mass %) of the conductive polymer and the dopant in the electrolyte layer may be higher than the content (mass %) of the conductive particles in the electrolyte layer. The aforementioned conductive polymer is typically more conductive than the aforementioned conductive particles. Therefore, increasing the content of the conductive polymer is more effective in achieving a lower initial ESR.

The electrolytic capacitor of the present disclosure may satisfy the following conditions (1) and (2).
  (1) The anode body has a porous portion at the surface (the surface at which the dielectric layer is formed), and the average particle diameter of the conductive particles is larger than the average pore diameter of the porous portion at the surface of the anode body.
  (2) The conductive polymer is in the form of particles, and the average particle diameter of the conductive polymer is smaller than the average pore diameter of the porous portion at the surface of the anode body.

As described above, the aforementioned conductive polymer is typically more conductive than the aforementioned conductive particles. Therefore, by disposing the conductive polymer near the surface of the anode body, a low initial ESR can be achieved. When the above conditions (1) and (2) are satisfied, the conductive polymer is likely to be disposed in the voids (pores) of the porous portion of the anode body. That is, the conductive polymer is likely to be disposed near the dielectric layer at the surface of the anode body. As a result, a low initial ESR can be achieved.

In the present specification, the average particle diameter of the particles is a median diameter ($D_{50}$) at 50% cumulative volume in a volumetric particle size distribution. The median diameter can be measured, for example, using a laser diffraction/scattering type particle size distribution analyzer.

In the present specification, the average pore diameter of the porous portion at the surface of the anode body is a median diameter ($D_{50}$) at 50% cumulative volume in a volumetric pore distribution. The median diameter can be measured, for example, by gas adsorption pore distribution analysis.

The electrolytic capacitor of the present disclosure may satisfy the following condition (3).
  (3) The electrolyte layer includes a polymer layer (conductive polymer layer) constituted of a conductive polymer, and the polymer layer includes a first polymer layer formed on the dielectric layer at the surface of the anode body, and a second polymer layer formed on the first polymer layer. That is, the first polymer layer is disposed between the dielectric layer at the surface of the anode body and the second polymer layer.

When the electrolyte layer includes the first and second polymer layers, the conductive polymer contained in the first polymer layer and the conductive polymer contained in the second polymer layer may be the same or different from each other. The conductive particles may be contained in both the first and second polymer layers, or may be contained in only one of them. When both the first and second polymer layers contain conductive particles, the conductive particles contained in the first polymer layer and the conductive particles contained in the second polymer layer may be the same or different from each other.

The electrolytic capacitor of the present disclosure may satisfy the above condition (3) and the following condition (4).
  (4) The content (mass %) of the conductive particles in the second polymer layer is higher than the content (mass %) of the conductive particles in the first polymer layer. The conductive particles may be contained in both the first and second polymer layers, or may be contained only in the second polymer layer.

The above condition (4) may be replaced by the condition (4'): the content (mass %) of the conductive polymer in the first polymer layer is higher than the content (mass %) of the conductive polymer in the second polymer layer. By reducing the content of the conductive particles in the first polymer layer, thereby to increase the content of the conductive polymer, the ratio of the conductive polymer disposed near the dielectric layer at the surface of the anode body can be increased. This can result in a low initial ESR.

The electrolytic capacitor of the present disclosure may satisfy the following conditions (A) and (B), and may further satisfy the condition (C). The electrolytic capacitor satisfying these conditions can have excellent characteristics and high reliability.
  (A) The conductive polymer is poly(3,4-ethylenedioxythiophene), and the dopant is polystyrene sulfonic acid.
  (B) The conductive particles are particles of a conductive carbon material, and are, for example, at least one kind of particles selected from the group consisting of carbon black particles, carbon nanotube particles, graphite particles, and graphene particles. Alternatively, the conductive particles may be at least one kind of particles selected from the group consisting of metal particles and particles of a conductive carbon material.

(C) The total mass Wm (g) of the conductive polymer and the dopant contained in the electrolyte layer and the mass Wp (g) of the conductive particles contained in the electrolyte layer satisfy 1<Wm/Wp, and, for example, satisfy 2≤Wm/Wp<20. Alternatively, the ratio Wp/Wm may be in the above range.

The components (anode body, cathode body, separator, etc.) of the capacitor element other than the electrolyte are not limited, and any known ones may be used. Those of the first capacitor elements will be described below by way of examples.

(Anode Body)

For the anode body, a metal foil having a dielectric layer formed at a surface of the foil may be used. The metal foil may be constituted of any kind of metal. In terms of the ease of formation of the dielectric layer, examples of the metal constituting the metal foil include a valve metal, such as aluminum, tantalum, niobium, and titanium, and an alloy of a valve actin metal. Preferred examples thereof are aluminum and an aluminum alloy. Usually, a surface of the anode body is roughened (made porous). The dielectric layer of the anode body is formed at the porous portion (roughened surface). The electrolyte layer is in contact with the dielectric layer of the anode body.

(Cathode Body)

The cathode body may be made of a metal foil. The metal foil may be constituted of any kind of metal. Examples of the metal constituting the metal foil include a valve metal, such as aluminum, tantalum, niobium, and titanium, and an alloy of a valve metal. Preferred examples thereof are aluminum and an aluminum alloy. The surface of the cathode body may include a chemical conversion film, or may include a surface film of a metal different from the metal constituting the cathode body (i.e., a dissimilar metal), or a non-metal. Examples of the dissimilar metal and the non-metal include a metal, such as titanium, and a non-metal, such as carbon.

(Separator)

As the separator, a sheet-like material that can be impregnated with an electrolyte can be used, and for example, a sheet-like material that has electrically insulating properties and can be impregnated with an electrolyte may be used. The separator may be a woven fabric, a non-woven fabric, or a porous film. Examples of the material of the separator include cellulose, polyethylene terephthalate, polybutylene terephthalate, polyphenylene sulfide, vinylon, nylon, aromatic polyamide, polyimide, polyamideimide, polyetherimide, rayon, and glass.

Examples of the components other than the electrolyte layer of the second capacitor element will be described below. The second capacitor element includes a porous anode body having a dielectric layer formed at a surface of the anode body, a cathode layer, and an electrolyte layer disposed between the anode body and the cathode layer.

The porous anode body may be, for example, a porous sintered body obtained by sintering material particles containing a valve metal. The anode body may have a rectangular parallelepiped shape. Examples of the valve metal include titanium (Ti), tantalum (Ta), and niobium (Nb). The material particles may be made of an alloy containing a valve metal. For example, an alloy of a valve metal and silicon, vanadium, boron or the like may be used. The alloy of a valve metal contains the valve metal as a main component, and contains, for example, 50 atom % or more valve metal. Also, material particles made of a compound containing a valve metal and a typical element, such as nitrogen, may be used. The material particles may be used singly or in combination by mixing two or more kinds.

The anode body of the second capacitor element, which is porous, has a porous portion at the surface, and the dielectric layer is formed at the porous portion. The electrolyte layer is in contact with the dielectric layer of the anode body. The dielectric layer can be formed by, for example, subjecting a sintered body, which is to be as an anode body, to a chemical conversion treatment, so that an oxide film grows at the surface of the sintered body.

The cathode layer has a current collecting function. The cathode layer is formed of, for example, a conductive material. The cathode layer may be a conductive layer formed so as to cover the electrolyte layer. The cathode layer may include a carbon layer formed so as to cover the electrolyte layer and a metal paste layer formed on the carbon layer. The carbon layer may contain a conductive carbon material, such as graphite, and a resin. The metal paste layer may contain metal particles (e.g., silver particles) and a resin. The cathode layer can be formed by applying the above material or the like.

(Method of Producing Electrolytic Capacitor)

The method of the present disclosure for producing an electrolytic capacitor will be described below. According to this method, the electrolytic capacitor of the present disclosure can be produced. The matters described for the electrolytic capacitor of the present disclosure can be applied to the following production method, and redundant description may be omitted. For example, since the components of the capacitor element and the like have been described above, redundant description may be omitted. The matters described in the following production method can be applied to the aforementioned electrolytic capacitor.

The production method according to the present disclosure includes steps (i), (ii), and (iii). These steps will be described below.

(Step (i))

The step (i) is a step (i) of preparing a capacitor element precursor including an anode body having a dielectric layer formed at a surface of the anode body. The step (i) may be a step of forming a capacitor element precursor by a known method.

When producing an electrolytic capacitor including the first capacitor element, the step (i) may be a step of forming a capacitor element precursor including a foil-form anode body having a dielectric layer formed at a surface of the anode body, a foil-form cathode body, a separator disposed between the anode body and the cathode body, and an electrolyte layer disposed between the anode body and the cathode body. In this case, as described above, the capacitor element precursor may be a wound type or a stacked type. When producing an electrolytic capacitor including the second capacitor element, the capacitor element precursor may be constituted of an anode body (a porous anode body) having a dielectric layer formed at a surface of the anode body, and an anode wire partially embedded in the anode body.

(Step (ii))

The step (ii) is a step of forming a polymer layer containing a conductive polymer doped with a dopant and conductive particles, so as to be adjacent to the dielectric layer, by an impregnation treatment.

The impregnation treatment in the step (ii) may be an impregnation treatment (x) of impregnating the capacitor element precursor with a dispersion including conductive particles and a conductive polymer doped with a dopant. For example, the capacitor element precursor is immersed in the dispersion, to allow the dispersion to impregnate thereinto. By removing (drying) the dispersion medium in the dispersion impregnated into the capacitor element precursor, a polymer layer containing the conductive polymer doped with the dopant and the conductive particles can be disposed so as to be adjacent to the dielectric layer. The impregnation treatment (x) may be performed a plurality of times. In that case, a drying step of removing the dispersion medium in the impregnated dispersion may be performed before the second and subsequent impregnation treatments (x).

The dispersion medium in the dispersion is not limited, and a known dispersion medium may be used. For example, as the dispersion medium, an aqueous liquid containing water may be used, or water may be used.

The contents of the conductive polymer and the conductive particles in the dispersion are not limited, and may be any content with which the impregnation treatment is possible. The content of the conductive polymer in the dispersion may be in the range of, for example, 0.1 mass % to 10 mass %. The content of the conductive particles in the dispersion may be adjusted according to the content of the conductive polymer.

By adjusting the mass (content) of the conductive polymer and the mass (content) of the conductive particles in the dispersion, the ratio of them in the formed electrolyte layer can be adjusted. For example, by setting the mass (content) of the conductive polymer in the dispersion higher than that of the conductive particles in the dispersion, the mass of the conductive polymer contained in the formed electrolyte layer can be higher than that of the conductive particles contained therein.

The impregnation treatment in the step (ii) may include an impregnation treatment (y) and an impregnation treatment (z). Regarding the impregnation treatment (y) and the impregnation treatment (z), the impregnation treatment (y) may be performed earlier, or the impregnation treatment (z) may be performed earlier, or both may be performed simultaneously. In a preferred example, after the impregnation treatment (y), the impregnation treatment (z) is performed. The impregnation treatment (y) and the impregnation treatment (z) may be independently performed a plurality of times. Further, after each of the impregnation treatment (y) and the impregnation treatment (z), the drying step of removing the dispersion medium in the impregnated dispersion may be performed.

The impregnation treatment (y) is an impregnation treatment of impregnating the capacitor element precursor with a first dispersion including a conductive polymer doped with a dopant. The impregnation treatment (z) is an impregnation treatment of impregnating the capacitor element precursor with a second dispersion containing conductive particles. Regarding the dispersion medium in the first and second dispersions, and the impregnation method, those as described in the impregnation treatment (x) may be applied.

In one example, the first dispersion does not contain conductive particles and the second dispersion does not contain a conductive polymer doped with a dopant. However, the first dispersion may contain conductive particles, and the second dispersion may contain a conductive polymer doped with a dopant.

Description will be given below of a case in which both the first and second dispersions contain a conductive polymer doped with a dopant. In this case, after one of the impregnation treatment (y) and the impregnation treatment (z) is performed, drying may be performed, and then, the other impregnation treatment may be performed. By doing so, a polymer layer including a first polymer layer and a second polymer layer can be formed. By adjusting the contents of the conductive particles in the first dispersion and in the second dispersion, the contents of the conductive particles in the first polymer layer and in the second polymer layer can be adjusted.

(Step (iii))

The step (iii) is a step of impregnating the polymer layer formed in step (ii) with a non-aqueous solvent. This forms an electrolyte layer containing the conductive polymer doped with the dopant, the conductive particles, and the non-aqueous solvent. The step (iii) may be a step of impregnating the polymer layer formed in the step (ii) with an electrolyte solution containing a non-aqueous solvent. In other words, the step (iii) may be a step of impregnating the polymer layer formed in the step (ii) with a liquid component (L).

The impregnation method in the step (iii) is not limited, and a known method may be used. For example, the capacitor element precursor having been subjected to the step (ii) is immersed in a non-aqueous solvent (or electrolyte solution). For the non-aqueous solvent (or electrolyte solution) used in the step (iii), those as mentioned above can be applied.

In the production method of the present disclosure, the dopant may be a polymer dopant containing an acidic group, and the step (iii) may be a step of impregnating the polymer layer with an electrolyte solution containing a non-aqueous solvent and a base component dissolved in the non-aqueous solvent.

By the step (iii), a first capacitor element can be obtained. Alternatively, by the step (iii), the anode body and the electrolyte layer of a second capacitor element can be obtained. After the step (iii), an electrolytic capacitor is produced using the components obtained in the step (iii). The process is not limited, and a known method can be used.

In the following, an example of the electrolytic capacitor according to the present disclosure will be specifically described with reference to the drawings, but the electrolytic capacitor of the present disclosure is not limited by the drawings below. The aforementioned components can be applied to the components of the below-described examples of the electrolytic capacitor. The components of the below-described examples of the electrolytic capacitor can be changed based on the above description. The matters described below may be applied to the above-described embodiments. The same reference numerals are sometimes used to refer to the same or similar components, and redundant description may be omitted.

Embodiment 1

Figure 2:
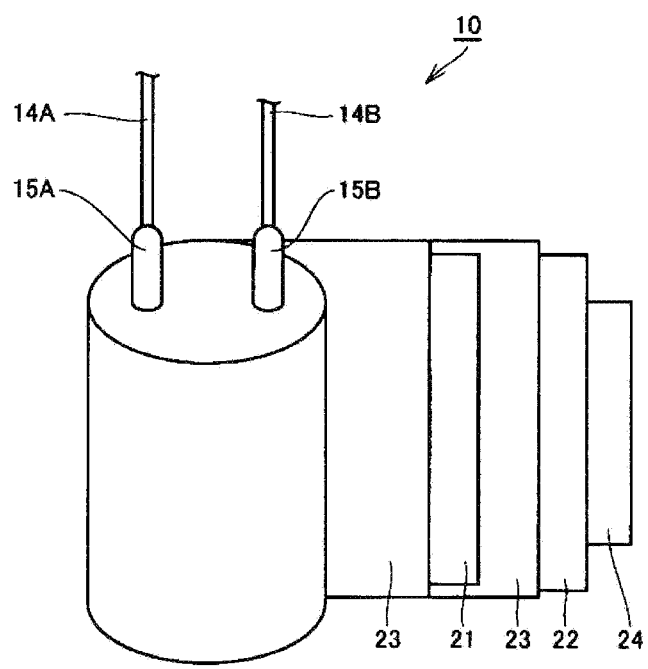
FIG. 2 A schematic partial view of the electrolytic capacitor of FIG. 1.

In Embodiment 1, an example of the electrolytic capacitor according to the present disclosure will be described. This electrolytic capacitor is an electrolytic capacitor including the first capacitor element. FIG. 1 schematically shows a cross section of an example of an electrolytic capacitor 100 of Embodiment 1. FIG. 2 shows a partially-exploded schematic view of a capacitor element 10 included in the electrolytic capacitor 100 shown in FIG. 1.

As illustrated in FIG. 1, the electrolytic capacitor 100 includes the capacitor element 10, a bottomed case 11 housing the capacitor element 10, a sealing member 12 closing the opening of the bottomed case 11, a seat plate 13 covering the sealing member 12, lead wires 14A and 14B extended from the sealing member 12 and passing through the seat plate 13, and lead tabs 15A and 15B connecting the lead wires 14A and 14B to the electrodes of the capacitor element 10. The capacitor element 10 is housed in the bottomed case 11. The bottomed case 11 is drawn inward in the vicinity of the edge of the opening, and the edge of the opening of the bottomed case 11 is bent and crimped onto the sealing member 12.

Referring to FIG. 2, the capacitor element 10 includes a foil-form anode body 21 having a dielectric layer formed at a surface of the anode body, a foil-form cathode body 22, and a separator 23 and an electrolyte layer (not shown) disposed therebetween. The anode body 21 and the cathode body 22 are wound, with the separator 23 disposed therebetween. The outermost layer of the wound body is secured with a winding stop tape 24. The lead tab 15A is connected to the anode body 21, and the lead tab 15B is connected to the cathode body 22. FIG. 2 illustrates a partially exploded state before the outermost layer of the wound body is secured.

EXAMPLES

In the following, embodiments of the present disclosure will be more specifically described by way of Examples.

Examples

[Production of Capacitor A1]

A wound-type electrolytic capacitor having a rated voltage of 35 V and a rated capacitance of 270 μF was produced as a capacitor A1. The capacitor A1 was produced by the following procedure.

(Preparation of Cathode Body and Anode Body)

As a cathode body, an Al foil (aluminum foil) having a thickness of 70 μm was used. An anode body having a dielectric layer formed at a surface of the anode body was produced by the following procedure. First, an Al foil having a thickness of 120 μm was prepared. The Al foil was subjected to a DC etching treatment, to roughen its surface. Next, the Al foil was subjected to a chemical conversion treatment. Specifically, the Al foil was immersed in an aqueous solution of ammonium adipate, and a voltage of 50 V was applied to the Al foil to allow chemical conversion to proceed at 70° C. for 30 minutes, thereby to form a dielectric layer (thickness: approx. 70 nm) at a surface of the Al foil. In this way, the anode body having a dielectric layer formed at the surface was obtained. Then, the obtained anode body was cut in a predetermined size, thereby to prepare an anode body of the capacitor A1.

(Preparation of PEDOT:PSS Dispersion)

A dispersion of a second conductive polymer doped with a dopant was prepared by the following method. First, a mixed solution of 3,4-ethylenedioxythiophene and polystyrene sulfonic acid (dopant) was prepared by dissolving them in ion-exchanged water, to prepare a mixed solution of them. To the mixed solution under stirring, iron(III) sulfate (oxidizing agent) dissolved in ion-exchanged water was added, to allow polymerization to proceed. After the reaction was completed, the resultant reaction solution was dialyzed, to remove the unreacted monomer and the excess oxidizing agent. In this way, a dispersion containing poly(3,4-ethylenedioxythiophene) doped with polystyrene sulfonic acid (approx. 5 mass % relative to the poly(3,4-ethylenedioxythiophene)) was obtained. In the following, the poly(3,4-ethylenedioxythiophene) doped with polystyrene sulfonic acid is sometimes referred to as "PEDOT:PSS."

(Addition of Conductive Particles to PEDOT:PSS Dispersion)

To the PEDOT:PSS dispersion, nickel metal particles (shape: spherical, average particle diameter: 2 μm) were added. In this way, a treatment liquid A containing PEDOT:PSS and conductive particles was prepared.

(Fabrication of Wound Body)

To the anode body and the cathode body obtained above, an anode lead tab and a cathode lead tab each attached with a lead wire were connected respectively. Then, the anode body and the cathode body were wound with a separator therebetween, and the outer surface was secured with a winding stop tape. The separator used here was a non-woven fabric made of cellulose. In this way, a wound body (capacitor element precursor) was fabricated. The fabricated wound body was immersed in an ammonium adipate solution, and, under application of a voltage of 50 V, the anode body was subjected to chemical conversion again at 70° C. for 60 minutes. By this chemical conversion treatment, a dielectric layer was formed mainly at the end surface of the anode body.

(Formation of Conductive Polymer Layer)

First, the above treatment liquid A was placed in a container. The wound body was immersed in the treatment liquid A in the container for 15 minutes in a reduced pressure atmosphere (40 kPa) at room temperature, and then, the wound body was pulled up from the treatment liquid A. In this way, the wound body was impregnated with the treatment liquid A. Next, the wound body was dried in a drying oven at 60° C. for 30 minutes, followed by subsequent drying at 150° C. for 30 minutes. As a result, the solvent contained in the treatment liquid A was dried and removed. In this way, a conductive polymer layer containing conductive particles was formed.

(Impregnation of Electrolyte Solution)

The wound body including the conductive polymer layer was impregnated with an electrolyte solution under atmospheric pressure at room temperature. The electrolyte solution used here was a mixed solution of polyethylene glycol, γ-butyrolactone, sulfolane, and mono(ethyldimethylamine) phthalate (solute) in a mass ratio of polyethylene glycol:γ-butyrolactone:sulfolane:mono(ethyldimethylamine) phthalate=30:30:20:20. In this way, a capacitor element including an electrolyte layer was obtained. This capacitor element was sealed, to complete an electrolytic capacitor. Thereafter, aging was performed at 130° C. for 2 hours under application of a rated voltage. In this way, the capacitor A1 was obtained.

[Production of Capacitors A2 and 3]

Capacitors A2 and A3 were produced using similar materials and under similar conditions to those for the capacitor A1, except the content of the conductive particles in the treatment liquid A.

[Production of Capacitors B1 to B3]

Capacitors B1 to B3 were produced using similar materials and under similar conditions to those for the capacitor A1, except the kind and content of the conductive particles in the treatment liquid A. In the production of the capacitors B1 to B3, graphene (shape: flaky, average particle diameter: 0.4 μm) was used as the conductive particles.

[Production of Capacitor C1 (Comparative Example)]

A capacitor C1 was produced using similar materials and under similar conditions to those for the capacitor A1, except for using no conductive particles. The conductive polymer layer of the capacitor C1 therefore contains PEDOT:PSS but does not contain conductive particles.

(Measurement of ESR)

With respect to the electrolytic capacitors produced as described above, the equivalent series resistance (ESR) was measured. The ESR was measured in an environment of 20° C. using an LCR meter for 4-terminal measurement. For the ESR, an initial value upon production of an electrolytic capacitor and values after the electrolytic capacitor was left to stand at a high temperature (at 145° C. for 150 hours and 500 hours) were measured. As an index of long-term characteristics, the percentage change in ESR was calculated by percentage from the following formula.

Change in ESR (%)={100×(value of ESR after standing at high temperature)/(initial value of ESR)}−100

Some of the conditions for forming the electrolyte layer of the above electrolytic capacitors are shown in Table 1. The mass ratio (or ratio of contents) of the conductive particles to the PEDOT:PSS in the formed electrolyte layer can be regarded as equal to the ratio of their contents in the treatment liquid. Therefore, the mass ratio of them in the electrolyte layer was calculated from the contents of them in the treatment liquid. The evaluation results of the ESR of the above electrolytic capacitors are shown in Table 2.

TABLE 1

| Capacitor | Conductive particles | | | Content in treatment liquid [mass %] | | Mass ratio in electrolyte layer |
| | Material | Shape | Ave. particle dia. [µm] | Conductive particles | PEDOT:PSS | Conductive particles/ (PEDOT:PSS) |
| --- | --- | --- | --- | --- | --- | --- |
| A1 | Ni | spherical | 2 | 0.3 | 2.0 | 0.15 |
| A2 | Ni | spherical | 2 | 2.0 | 2.0 | 1.0 |
| A3 | Ni | spherical | 2 | 3.0 | 2.0 | 1.5 |
| B1 | graphene | flaky | 0.4 | 0.3 | 2.0 | 0.15 |
| B2 | graphene | flaky | 0.4 | 0.7 | 2.0 | 0.35 |
| B3 | graphene | flaky | 0.4 | 3.0 | 2.0 | 1.5 |
| C1 | | None | | 0.0 | 2.0 | 0.0 |

TABLE 2

| | Change in ESR [%] | |
| | after 150 hours | after 500 hours |
| --- | --- | --- |
| A1 | −0.37 | 2.5 |
| A2 | −0.34 | 1.3 |
| A3 | −0.34 | 0.11 |
| B1 | 1.7 | 21 |
| B2 | 0.63 | 0.66 |
| B3 | 0.13 | 0.29 |
| C1 | 20 | 65 |

A lower change in ESR is preferable. As shown in Table 2, the electrolytic capacitor C1 of Comparative Example exhibited a significant increase in the ESR after left to stand at a high temperature. On the other hand, the changes in ESR in the electrolytic capacitors A1 to A3 and B1 to B3 were sufficiently low. The mass ratio of conductive particles/ (PEDOT:PSS) was preferably 0.15 or more, more preferably 0.35 or more, or 1.0 or more.

INDUSTRIAL APPLICABILITY

The present disclosure is applicable to an electrolytic capacitor and a method for producing the same.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST 10 capacitor element
21 anode body
22 cathode body
23 separator
100 electrolytic capacitor

The invention claimed is:

1. An electrolytic capacitor, comprising a capacitor element, wherein
the capacitor element includes an anode body having a dielectric layer formed at a surface of the anode body, and an electrolyte layer disposed adjacent to the dielectric layer,
the electrolyte layer contains a conductive polymer doped with a dopant, conductive particles, and a non-aqueous solvent,
the anode body has a porous portion at the surface,
an average particle diameter of the conductive particles is larger than an average pore diameter of the porous portion,
the conductive polymer is in a particle form, and
an average particle diameter of the conductive polymer is smaller than the average pore diameter of the porous portion.

2. The electrolytic capacitor according to claim 1, wherein
the dopant is a polymer dopant containing an acidic group, and
the electrolyte layer contains an electrolyte solution including the non-aqueous solvent and a base component dissolved in the non-aqueous solvent.

3. The electrolytic capacitor according to claim 2, wherein a content of the base component in the electrolyte solution is 0.1 mass % or more and 20 mass % or less.

4. The electrolytic capacitor according to claim 1, wherein a total mass of the conductive polymer and the dopant contained in the electrolyte layer is larger than a mass of the conductive particles contained in the electrolyte layer.

5. The electrolytic capacitor according to claim 1, wherein the conductive particles are particles of a conductive carbon material.

6. The electrolytic capacitor according to claim 1, wherein the conductive particles include at least one kind of particles selected from the group consisting of carbon black particles, carbon nanotube particles, graphite particles, and graphene particles.

7. The electrolytic capacitor according to claim 1, wherein the electrolyte layer includes a polymer layer constituted of the conductive polymer,
the polymer layer includes a first polymer layer formed on the dielectric layer, and a second polymer layer formed on the first polymer layer, and
a content (mass %) of the conductive particles in the second polymer layer is larger than a content (mass %) of the conductive particles in the first polymer layer.

8. The electrolytic capacitor according to claim 1, wherein the dopant is polystyrene sulfonic acid, and
the conductive polymer is poly(3,4-ethylenedioxythiophene).

9. A method for producing an electrolytic capacitor, the method comprising:
a step (i) of preparing a capacitor element precursor including an anode body having a dielectric layer formed at a surface of the anode body,
a step (ii) of forming a polymer layer containing a conductive polymer doped with a dopant, and conductive particles, so as to be adjacent to the dielectric layer, by an impregnation treatment, and
a step (iii) of impregnating the polymer layer with a non-aqueous solvent, wherein
the anode body has a porous portion at the surface,
an average particle diameter of the conductive particles is larger than an average pore diameter of the porous portion,
the conductive polymer is in a particle form, and
an average particle diameter of the conductive polymer is smaller than the average pore diameter of the porous portion.

10. The method according to claim 9, wherein
the dopant is a polymer dopant containing an acidic group, and
the step (iii) is a step of impregnating the polymer layer with an electrolyte solution including the non-aqueous solvent and a base component dissolved in the non-aqueous solvent.

11. The method according to claim 9, wherein the impregnation treatment in the step (ii) is an impregnation treatment (x) of impregnating the capacitor element precursor with a dispersion including the conductive polymer doped with the dopant and the conductive particles.

12. The method according to claim 9, wherein
the impregnation treatment in the step (ii) includes:
an impregnation treatment (y) of impregnating the capacitor element precursor with a first dispersion including the conductive polymer doped with the dopant, and
an impregnation treatment (z) of impregnating the capacitor element precursor with a second dispersion including the conductive particles.

13. The method according to claim 9, wherein
the dopant is polystyrene sulfonic acid, and
the conductive polymer is poly(3,4-ethylenedioxythiophene).

14. An electrolytic capacitor, comprising a capacitor element, wherein
the capacitor element includes an anode body having a dielectric layer formed at a surface of the anode body, and an electrolyte layer disposed adjacent to the dielectric layer,
the electrolyte layer contains a conductive polymer doped with a dopant, conductive particles, and a non-aqueous solvent,
the electrolyte layer includes a polymer layer constituted of the conductive polymer,
the polymer layer includes a first polymer layer formed on the dielectric layer, and a second polymer layer formed on the first polymer layer,
both the first polymer layer and the second polymer layer contain the conductive particles, and
a content (mass %) of the conductive particles in the second polymer layer is larger than a content (mass %) of the conductive particles in the first polymer layer.

* * * * *